United States Patent Office 3,544,576
Patented Dec. 1, 1970

3,544,576
POLYVINYLCHLORIDE COMPOSITION STABILIZED WITH A BITUMINOUS MATERIAL
Wendell A. Barnes, Stillwell, Okla., and David L. Bash and Norman W. Franke, Penn Hills Township, Allegheny County, Pa., assignors to Gulf Research & Development Company, Pittsburgh, Pa., a corporation of Delaware
No Drawing. Continuation-in-part of application Ser. No. 718,256, Apr. 2, 1968. This application Apr. 14, 1969, Ser. No. 816,098
Int. Cl. C08f 45/52, 45/62
U.S. Cl. 260—28.5                   10 Claims

ABSTRACT OF THE DISCLOSURE

A stabilized resinous polyvinylchloride composition is provided containing a neutral branched-chain alkyl ester plasticizer and a stabilizer comprising between 0.2 and 2 weight percent of a bituminous material. If the composition contains, in addition, between 1 and 12 weight percent of the polyvinylchloride of at least one stable hydrogen chloride metal compound, such as dibasic lead phthalate, then the composition can suitably contain between 0.1 and 7 weight percent of said polyvinylchloride of a bituminous material.

---

This invention relates to improvements in resinous vinyl chloride compositions. In particular, this invention relates to improved stabilizers for use in resinous vinyl chloride type electrical wire coating compositions.

This application is a continuation-in-part of our copending Ser. No. 718,256, filed Apr. 2, 1968, now abandoned and assigned to the same assignee as the present application.

The use of compositions containing resinous vinyl chloride polymers or copolymers for electrical wire insulation is well known in the art. These vinyl chloride polymer compositions comprise a resinous vinyl chloride polymer, a plasticizer and one or more stabilizers. One of the indicia of a good resinous vinyl chloride polymer formulation for electrical insulation is the percent retention of elongation after an accelerated aging at elevated temperatures. The Underwriters' approval varies from 50 to 70 percent retention for various types of thermoplastic insulated wire. The resinous vinyl chloride polymer compositions of this invention have unexpectedly excellent percent retention of elongation properties after aging.

In accordance with the invention, an improved plastic electrical wire coating composition comprises a resinous vinyl chloride polymer, a neutral branched-chain alkyl ester plasticizer and between 0.1 and 2 weight percent of a bituminous material.

The compositions of this invention comprise a resinous vinyl chloride polymer. By a resinous vinyl chloride polymer is meant a resinous homopolymer of vinyl chloride or a resinous copolymer of vinyl chloride and other suitable monomers, such as vinyl acetate, propylene and vinylidene chloride, wherein at least 85 percent of the copolymer is vinyl chloride. The copolymer is preferably between 85 and 97 weight percent vinyl chloride. A resinous homo- or copolymer is one which is substantially solid at room temperature.

Various esters are known in the art to be useful as plasticizers for vinyl chloride type polymers. Branched-chain neutral alkyl esters, such as those obtained by the esterification of polybasic acids with branched-chain alcohols having from 6 to 13 carbon atoms per molecule, are particularly suitable for this purpose. The esters should be neutral, that is, no free acid groups should remain after esterification. The desirable polybasic acids or anhydrides are normally those having from 2 to 4 carboxyl groups and from 4 to 14 carbon atoms per molecule. Dibasic acids or anhydrides are preferred which have from 5 to 10 carbon atoms per molecule. Suitable specific examples of polybsaic acids or anhydrides include phthalic acid; phthalic anhydrdie; adipic; glutaric; pimelic; succinic; cumenyl succinic; sebacic; azelaic; diglycolic; isophthalic and trimellitic. It is preferred to employ phthalic anhydride to prepare the ester.

The branched-chain alcohols required for preparing the ester plasticizers of the compositions of this invention can be obtained from any suitable source. For example, 2-ethylhexyl alcohol can suitably be employed. The preferred alcohols, however, are those produced by the hydroformylation of branched-chain olefins (the celebrated oxo process). A typical isomer distribution for isooctyl alcohol is given on page 33 of the book Higher Oxo Alcohols by L. F. Hatch, New York, John Wiley & Sons, 1957. The oxo alcohols consist of isomers having at least one tertiary carbon atom, and usually the isomers have two tertiary carbon atoms. The tridecyl alcohol ($C_{13}$) predominates in tetramethylnonanols. The higher oxo alcohols apparently have no isomers with a quaternary carbon atom.

The esters can be prepared by any suitable procedure. One suitable procedure comprises contacting the selected alcohol with the selected dibasic acid in the presence of a strong mineral acid, such as sulfuric, and recovering the desired ester therefrom.

The amount of ester plasticizer in the resinous vinyl chloride polymer compositions of this invention can vary between 20 and 80 weight percent of the resinous vinyl chloride polymer and preferably is between 30 and 60 weight percent of the resinous vinyl chloride polymer. Secondary plasticizers well known in the art can also suitably be employed, such as t-butyl naphthalene.

The compositions of this invention comprise, in addition, a stabilizer comprising a bituminous material. Bituminous material is well known in the art and is generally a group of native solid or semisolid hydrocarbons such as asphalt soluble in carbon disulfide. Bituminous materials are rich in carbon and hydrogen and burn with a sooty flame. The bituminous materials generally have a high carbon residue, generally above 10 percent by ASTM Test D-189. The bituminous materials which can be used in the compositions of the present invention include substances containing bitumens or pyrobitumens, pyrogeneous distillates and tar, and pyrogeneous residues (pitches and pyrogeneous asphalts). As noted above, they are preferably composed mainly of hydrocarbons, although they may contain amounts of sulfur, nitrogen and oxygen-containing materials. Examples of suitable bituminous materials, termed "Asphalt," may be found in volume 2 of the Kirk-Othmer Encyclopedia of Chemical Technology, second edition, under "Asphalt."

The asphaltic bitumens are an especially preferred group to be used in the compositions of this invention. The asphaltic bitumen may occur naturally, such as Gilsonite, or may be derived from petroleum fractions, such as straight run fractions, blown, cracked and catalytically or noncatalytically polymerized asphaltic bitumens. Typical asphaltic bitumens have softening points by ASTM D-36 of from about 100° to greater than 320° F. The softening point of the asphaltic bitumens is not critical. Other preferred materials include high boiling raffinates obtained by the extraction of petroleum fractions, such as those raffinates obtained by extracting petroleum fractions with propane or pentane. Other types of extraction solvents, such as butane and hexane, can be employed. The raffinates are very high boiling materials which can be viscous liquids or tar-like materials at ordinary temperatures.

It is generally known that asphalt itself is a colloidal system having a disperse phase and a continuous phase. The disperse phase constitutes the components of highest molecular weight (i.e., the micelles) and these components are known in the art as asphaltenes. The continuous or intermicellar phase represents the lower molecular weight components, and these are generally known in the art as maltenes. The asphaltenes are insoluble in low boiling hydrocarbons, such as normal pentane, but are soluble in carbon tetrachloride. The solubility differences between the asphaltenes and maltenes in carbon tetrachloride serves as a basis for the separation of these two components. Both the asphaltenes and maltenes separately or together can be used as a stabilizer in the compositions of this invention.

Also preferred are the bituminous materials derived from coal, such as coal tars, refined coal tars and coal tar pitches. Particularly preferred are the coal tar pitches having softening points between 100° and 300° F.

The amount of the bituminous material to employ can suitably be between 0.1 and 10 weight percent of the resinous polyvinylchloride and is preferably between 0.4 and 2 weight percent. Most of the bituminous materials are very viscous liquids or solids at room temperature. This is not troublesome since the bituminous material is normally mixed with the solid resinous polyvinylchloride in particulate form and the other ingredients and the mixture is blended on the heated rolls of a mill or some other such suitable mixing device. Suitable temperatures would be used in the mixing device to achieve the desired blending.

In addition to the above bituminous materials, the compositions of this invention can contain those stabilizers or hydrogen chloride acceptors which are well known in the art as vinyl chloride stabilizers.

Various stable metal compounds are employed in the art as hydrogen chloride acceptors. By "stable metal compounds" is meant at least one compound of a metal selected from the group consisting of cadmium, barium, zinc, tin and lead which does not decompose and has essentially no volatility at 350° F. and atmospheric temperature. One suitable class of metal compounds are the basically reacting metal salts of organic acids having between 1 and 20 carbon atoms. Another suitable class of metal compounds are the basically reacting metal sulfates. Still another class of suitable metal compounds used in the art are the basically reacting metal silicate sulfates. Lead stabilizers are used in practically all of the commercial polyvinylchloride electrical compounds. Suitable specific examples of known stabilizers for use in resinous polyvinylchloride include dibasic lead phthalate, basic lead silicate sulfate, hydrous tribasic lead sulfate, dibasic lead stearate, dibasic lead carbonate, dibasic lead phosphate, dibutyl tin dilaurate and dibutyl tin diacetate. The preferred stabilizers include dibasic lead phthalate, basic lead silicate sulfate and hydrous tribasic lead sulfate.

The concentration of the above metal compound stabilizers when employed can vary from about 1 to 12 weight percent of the resinous vinyl chloride polymer with usual amounts between 3 and 10 weight percent.

It has been found that when the compositions of this invention contain a hydrogen chloride acceptor metal compound, as defined above, that somewhat larger amounts of bituminous material can be utilized as an auxiliary stabilizer. Thus, when the compositions contain a hydrogen chloride acceptor metal compound in an amount from 1 to 12 weight percent, the compositions can suitably contain from 0.1 to about 7 weight percent of a bituminous material. Preferred amounts of the bituminous material in this instance are from 0.2 to 5 weight percent, with the more preferred amounts being from 0.4 to 4 weight percent. The use of larger amounts of bituminous material, for example the use of 10 weight percent, even in combination with a hydrogen chloride acceptor metal compound, results in poor stability of the polyvinylchloride compositions to heat aging.

Fillers can also suitably be employed in the compositions of this invention if desired. The function of a filler is sometimes solely as a low-cost extender, but a filler can be employed to impart additional desired properties to the resinous polyvinylchloride. A finely divided clay is used as the principal filler in the vinyl electrical compositions of the subject invention. Other suitable fillers include calcium carbonate, silica and alumina. The amount of filler can vary between 0 and 50 weight percent of the polyvinylchloride with preferred amounts between 5 and 30 weight percent.

A lubricant, such as stearic acid, can also be employed to aid in processing the compositions of this invention. The amount of lubricant can vary between 0.1 and 1.0 weight percent of the polyvinylchloride, with preferred amounts between 0.2 and 0.5 weight percent.

Insulated electric wire is classified as to the maximum temperature to which it is subjected in use. Underwriters' Laboratories set the standards for most of the building and applicance wire used in the United States. Since the phthalate esters and the resinous vinyl chloride type electrical wire compounds plasticized with them are regarded as having satisfactory electrical properties, the critical test that they must pass to be used in electrical insulation is the retention of elongation after oven aging.

Underwriters' Laboratories has an accelerated aging test in a mechanical convection oven for wire compounds. In this test the wire compound is subjected to a temperature above that of its maximum operating temperatures in use, as designated by its class for seven days. To pass this test the wire compound must have a minimum retention of elongation as shown in Table I below. The percent retention of the property is calculated by dividing the value measured on a specimen after oven aging by the value obtained on an unaged specimen taken from the same sheet. The 80° C., 90° C. and 105° C. Appliance Wires referred to in Table I below, formerly called radio hook-up wire, are for the indicated maximum temperature and are used, as the name indicates, in electrical appliances.

TABLE I

| Class | Oven temp., °C. | Time in oven, days | Percent retention, elongation |
| --- | --- | --- | --- |
| 80° C. Appliance wire [1] | 113 | 7 | 65 |
| 90° C. Appliance wire [1] | 121 | 7 | 65 |
| 105° C. Appliance wire [1] | 136 | 7 | 65 |

[1] Underwriters' Laboratories, Inc. Subject 758, issued October 5, 1950, revised Mar. 21, 1961, entitled "Outline of Proposed Investigation Thermoplastic-Insulated Appliance Hook Up Wire."

In oven aging runs made in an unmodified oven the variations in elongation retention were found to be greater than ±10 percent. In this type of oven the results depended greatly on the position of the specimen in the oven. Since Underwriters' Laboratories use an unmodified oven in this test, insulated wire manufacturers put a safety factor in their wire formulations. While the unmodified oven simulates commercial practice it is too erratic to determine small differences in stabilizers, especially when the stabilizer is used as an auxiliary stabilizer. To overcome this difficulty, an Apex-Royan tubular oven unit was installed in a Blue M Model POM-102 RAZ oven. The tubular oven has dampers to control the air flow over the specimens in each tube. The air flow over the specimens is a very important factor.

In the examples which follow, the vinyl chloride polymer compositions were subjected to the 105° C. wire test. In the 105° C. wire tests two dumbbell shaped specimens were placed in each of the 16 tubes of the oven and were aged seven days at 136° C. with an air flow of 400 ft./min. and with the fresh air inlet one-fourth open.

To calibrate the oven the 105° C. test was run on Geon 8630, a commercial 105° C. wire compound made by B. F. Goodrich Chemical Company. Geon 8630 was found in this work to have an average elongation retention of 80 percent in the 105° C. test, which is within the range claimed for this material.

Test specimens for Examples 1–21 had the following compositions:

100 parts of resinous vinyl chloride homopolymer;
50 parts of ditridecylphthalate plasticizer;
15 parts of filler;
7 parts of a metal compound stabilizer;
0.5 parts of a lubricant; and between
0 and 1 parts of a bituminous material stabilizer.

The resinous vinyl chloride polymer (Geon 101) was a homopolymer of vinyl chloride. The ditridecylphthalate plasticizers had a molecular weight of 530, a specific gravity of 0.950, a boiling point at 3.5 mm. Hg of 285° C., a pour point of −35° F., a flash point of 455° F., a viscosity at 25° C. of 190 cps. and a refractive index of 1.483.

The filler was a light colored fine mesh #33 clay purchased from the Southern Clay Company.

The metal compound stabilizer was dibasic lead phthalate.

The lubricant was stearic acid.

The exact amount and type of bituminous stabilizer is given in each of the examples below.

The ingredients were mixed for ten minutes and the premixed composition was placed on hot rolls of a 6" x 13" laboratory mill, and milled for seven minutes at 340°–345° F. during which time the sheet was cut back and forth to thoroughly blend the stock. A 6" x 6" panel of the 50 mil sheet from the mill was prepared for testing by molding in a hydraulic press at 330° F. under 1,000 pounds pressure for five minutes and 10,000 pounds pressure for an additional five minutes.

All of the samples were aged at constant temperature and humidity (73°±2° F., 50±2 percent relative humidity) for a minimum of 24 hours before and after oven aging.

EXAMPLE 1

In this example, no bituminous stabilizer was employed and the percent retention of elongation after oven aging was 24.

A series of runs were made adding various asphaltic bituminous materials in concentrations of 0.2, 0.5 and 1.0 parts per hundred parts of resin (PHR). The properties of the various bituminous materials are shown in Table II below and the results of these runs are shown in Table III below.

Referring to Table III below, the coal tar pitch (Example 2); the propane asphalt (Example 8); the asphaltenes (Example 12) and the Iranian asphalts (Examples 14 and 16) all gave retention of elongation values after aging of greater than 50 percent at the 0.2 weight percent level. Other bituminous materials such as the Gilsonite (Examples 4 and 5); deashed coal (Examples 6 and 7); maltenes (Examples 10 and 11); and asphalts from Texas and South Louisiana crudes (Examples 18–21) required more than 0.2 weight percent to be effective. The data in Table III below does show that bituminous material from a great variety of sources is effective in accomplishing the desired stabilization.

TABLE II

| Inspection | Coal tar pitch | Gilsonite | Deashed coal | Propane asphalt | Maltenes | Asphaltenes | Asphalt Gach Saran, Iran | Asphalt Agha Jari crude | Asphalt East Texas | Asphalt South La. |
|---|---|---|---|---|---|---|---|---|---|---|
| Gravity: ° API | 1.278 | | | | 11.4 | 1.0682 | 1.021 | 1.001 | 1.014 | 0.9869 |
| Sulfur: wt. percent | 0.59 | | 1.35 | 5.99 | 4.34 | 7.28 | 3.43 | 3.28 | 1.50 | 0.80 |
| Carbon residue: D-189 wt. percent | 44.0 | | | 26.7 | 10.41 | 46.14 | 22.0 | 17.6 | 16.7 | 16.5 |
| Softening point: ° F | 119.5 | | 356 | 156 | 270 | 291 | 130.5 | 116.5 | 151.5 | 116.7 |

TABLE III

| Example No. | Description of bituminous stabilizer | Amount PHR* of bituminous stabilizer | Oven aging at 136° C. for seven days, percent retention of elongation |
|---|---|---|---|
| 1 | None | None | 24 |
| 2 | Coal tar pitch | 0.2 | 82 |
| 3 | do | 1.0 | 63 |
| 4 | Gilsonite | 0.2 | 26 |
| 5 | do | 1.0 | 75 |
| 6 | Deashed coal | 0.2 | 42 |
| 7 | do | 1.0 | 78 |
| 8 | Propane asphalt | 0.2 | 107 |
| 9 | do | 1.0 | 98 |
| 10 | Maltenes | 0.2 | 23 |
| 11 | do | 1.0 | 84 |
| 12 | Asphaltenes | 0.2 | 64 (76) (91) |
| 13 | do | 1.0 | 82 |
| 14 | Asphalt from Gach Saran, Iran | 0.2 | 52 |
| 15 | do | 0.5 | 88 |
| 16 | Asphalt from Agha Jari crude, Iran | 0.2 | 82 |
| 17 | do | 0.5 | 89 |
| 18 | Asphalt from East Texas crude 1,100° F. bottoms | 0.2 | 34 |
| 19 | do | 0.5 | 102 |
| 20 | Asphalt S. La. crude 1,080° F. bottoms | 0.2 | 15 |
| 21 | do | 0.5 | 94 |

*PHR=parts per hundred parts of polyvinylchloride.

EXAMPLE 22

Example 1 is repeated using a vinyl acetate-vinyl chloride copolymer in place of the vinyl chloride homopolymer. Results similar to those in Example 1 are obtained.

EXAMPLE 23

Example 22 is repeated except a small amount of a bituminous material is added and results similar to those in Example 15 are obtained.

EXAMPLE 24

The test specimen for this example had the same composition as the test specimen for Examples 1–21 except the dibasic lead phthalate stabilizer was absent and no bituminous material was added. The remaining materials would not mill together, and thus the sample could not be run in the oven aging test.

Another series of runs was made with test specimens having the same composition as those in Examples 1–21 except varying amounts of the dibasic lead phthalate stabilizer and asphalt from Agha Jari crude, Iran were employed. In addition, two runs were made in the series using bisphenol A in place of the asphalt for comparison purposes. The results of this series of runs are given in Table IV below.

TABLE IV

| Example No.: | PHR[1] of dibasic lead phthalate stabilizer | Amount PRH[1] bituminous[2] stabilizer | Oven aging at 136° C. for seven days, percent retention of elongation |
|---|---|---|---|
| 25 | 7 | 0 | 21 |
| 26 | 7 | [3] 0.1 | 63 |
| 27 | 7 | [3] 0.5 | 85 |
| 28 | 0 | 1 | 73 |
| 29 | 0 | 7 | <5 |
| 30 | 7 | 1 | 86 |
| 31 | 7 | 5 | 75 |
| 32 | 7 | 10 | 55 |

[1] PHR=parts per hundred parts of polyvinylchloride.
[2] Bituminous stabilizer was the asphalt from Agha Jari crude, Iran whose properties are shown on Table II above.
[3] Bisphenol A was used here in place of the bituminous material.

Referring to Table IV above, Run 25 shows that using the lead stabilizer alone results in only a 21 percent retention of elongation, which is very poor. The addition of a 0.1 weight percent bisphenol A to the composition of Example 25 increases the percent retention of elongation to 63, which is marginal. Example 27 shows that the addition of 0.5 weight percent bisphenol A gives good results in that an 85 percent retention of elongation was obtained.

Example 28 shows that the addition of one percent asphalt results in a 73 percent retention of elongation even though no lead stabilizer is present.

Example 29, however, shows that the addition of 7 weight percent asphalt gives less than 5 percent retention of elongation in the absence of a lead stabilizer.

Example 30 is the same as Example 28 except 7 PHR of the lead stabilizer was additionally employed. The percent retention of elongation was excellent at 86 percent.

Example 31 shows that the addition of 5 weight percent asphalt results in a 75 percent retention of elongation, which is good.

Example 32 when compared with Examples 30 and 31 shows that the addition of 10 weight percent asphalt results in a drop in the retention of elongation to 55 percent, which is not satisfactory.

Thus, the data in Table IV above show that minor amounts of a bituminous material stabilize the polyvinylchloride resin in the absence of a hydrogen chloride acceptor metal compound, and these minor amounts are on the order of 0.1 to 2 weight percent of the polyvinylchloride. Somewhat greater but still small amounts of a bituminous material can be utilized in combination with the hydrogen chloride acceptor metal compound to effect a stabilization of the polyvinylchloride. Thus, amounts as high as 5 weight percent (Example 31) give satisfactory results, whereas amounts as great as 10 weight percent gave unsatisfactory results. Since a satisfactory percent retention of elongation is about 65 percent, the amount of bituminous material which can be tolerated as an auxiliary stabilizer in combination with the hydrogen chloride acceptor metal compounds defined above can be about 7 weight percent.

Resort may be had to such variations and modifications as fall within the spirit of the invention and the scope of the appended claims.

We claim:

1. A composition of matter comprising a major portion of a resinous vinyl chloride polymer, between 20 and 80 weight percent of said polymer of a neutral ester plasticizer prepared from a branched-chain alcohol and as a stabilizer from 0.1 to 2 weight percent of said polymer of a bitminous material.

2. A composition according to claim 1 wherein the bituminous material is an asphalt.

3. A composition according to claim 1 wherein the bituminous material is between 0.4 and 1.5 weight percent of a petroleum derived bituminous material.

4. A composition of matter comprising a major portion of a resinous vinyl chloride polymer, between 20 and 80 weight percent of said polymer of a neutral ester plasticizer prepared from a branched-chain alcohol, between 1 and 12 weight percent of said polymer of at least one stable hydrogen chloride acceptor metal compound selected from the group consisting of compounds of cadmium, barium, zinc, tin and lead and as an auxiliary stabilizer from 0.1 to 7 weight percent of said polymer of a bituminous material.

5. A composition according to claim 4 wherein the bituminous material is an asphalt.

6. A composition according to claim 4 wherein the bituminous material is between 0.4 and 4 weight percent of a petroleum derived bituminous material.

7. A composition according to claim 4 wherein the bituminous material is selected from the class consisting of coal tar, coal tar pitch, Gilsonite, deashed coal, petroleum derived asphalts, petroleum derived asphaltenes and petroleum derived maltenes.

8. A composition according to claim 4 wherein the hydrogen chloride metal compound is dibasic lead phthalate.

9. A composition of matter suitable for use as an electrical wire coating insulation comprising a major portion of a resinous vinyl chloride polymer, between 20 and 80 weight percent of said polymer of a neutral ester plasticizer prepared from a branched-chain alcohol, and as a stabilizer between 0.1 and 2 weight percent of said polymer of a bituminous material.

10. A composition of matter suitable for use as an electrical wire coating insulation comprising a major portion of a resinous vinyl chloride polymer, between 20 and 80 weight percent of said polymer of a neutral ester plasticizer prepared from a branched-chain alcohol, between 1 and 12 weight percent of said polymer of at least one stable hydrogen chloride acceptor metal compound selected from the group consisting of compounds of cadmium, barium, zinc, tin and lead, and as a stabilizer between 0.1 and 7 weight percent of said polymer of a bituminous material.

References Cited

UNITED STATES PATENTS

| 2,464,219 | 3/1949 | Doyle et al. | 260—28.5D |
| 2,608,547 | 8/1952 | Hendricks et al. | 260—45.75 |
| 2,635,085 | 4/1953 | Gonard et al. | 260—28.5D |
| 3,309,338 | 3/1967 | Scullin | 260—23X |
| 3,334,060 | 1/1967 | Robinson | 260—28.5D |

ALLAN LIEBERMAN, Primary Examiner

S. L. FOX, Assistant Examiner

U.S. Cl. X.R.

260—23, 45.75; 117—128